S. F. Estell.
Regulator for Time-Pieces.
Nº 73240      Patented Jan. 14, 1868.

Witnesses:
Joseph Kruge
John H. Polk.

Inventor:
Saml F. Estell

United States Patent Office.

SAMUEL F. ESTELL, OF RICHMOND, INDIANA.

Letters Patent No. 73,240, dated January 14, 1868.

IMPROVEMENT IN REGULATOR FOR TIME-PIECES.

*The Schedule referred to in these Letters Patent and making part of the same.*

TO ALL WHOM IT MAY CONCERN:

Be it known that I, SAMUEL F. ESTELL, of the city of Richmond, and State of Indiana, have invented a new and useful Improvement in Regulators for Time-Pieces; and I do hereby declare that the following is a full and exact description of the same, reference being had to the accompanying drawings, making a part of this specification, in which—

The same letters in different figures refer to corresponding parts of the invention.

Figure 2:
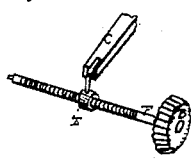
Figure 2 is a view of the parts embraced in the invention.
Figure 1:
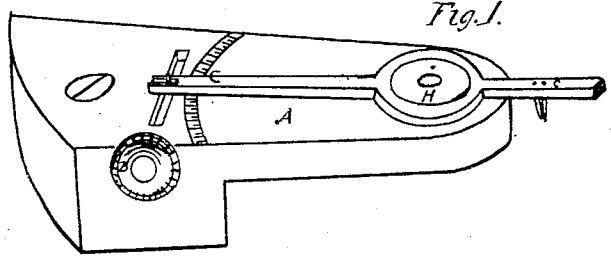
Figure 1 is a view of the regulator and immediate parts.

To enable others skilled in the art to make and use my invention, I will proceed to describe its construction and operation.

A represents the crown covering the balance-wheel; C represents the regulating-lever pivoted on the cap or collet H, and is connected to the hair-spring by pin S; F represents a screw, having a head, B, for convenience in turning said screw; E represents a nut on screw F, having a projection that engages with the end of lever C, and the latter is thus moved by turning screw F. In order to give the regulator free action, the end of lever C is slotted, in which slot the projection of nut E operates, and thus is allowed to move in a straight line, while the end of lever C describes an arc.

Having thus fully described my said invention, what I claim, and desire to secure by Letters Patent, is—

The combination of the regulating-lever C, having a slotted end, in combination with screw F and nut E, substantially as described, and for the purpose set forth.

SAM'L F. ESTELL.

Witnesses:
 JOSEPH RIDGE,
 JOHN H. PAPP.